United States Patent

Kunig et al.

[11] Patent Number: 5,542,879
[45] Date of Patent: Aug. 6, 1996

[54] METHOD AND APPARATUS FOR DETACHING THE MEAT FROM THE BONES OF THE EXTREMITIES OF ANIMALS

[75] Inventors: Helmut Kunig, Bad Schwartau; Marek Szymanski, Kleinmeinsdorf, both of Germany

[73] Assignee: Nordischer Maschinenbau Rud. Baader GmbH + Co KG, Lubeck, Germany

[21] Appl. No.: 450,980

[22] Filed: May 25, 1995

[30] Foreign Application Priority Data

May 26, 1994 [DE] Germany .......................... 44 18 366.6

[51] Int. Cl.⁶ .................................................. A22C 17/04
[52] U.S. Cl. .......................... 452/135; 452/136; 452/160
[58] Field of Search ..................................... 452/135, 136, 452/152, 154, 160, 167

[56] References Cited

U.S. PATENT DOCUMENTS

| | | | |
|---|---|---|---|
| 5,173,077 | 12/1992 | van den Nieuwelaar et al. | 452/135 |
| 5,178,580 | 1/1993 | Sekiguchi | 452/135 |
| 5,228,881 | 7/1993 | Sekiguchi et al. | 452/135 |
| 5,462,477 | 10/1995 | Ketels | 452/135 |

*Primary Examiner*—Willis Little
*Attorney, Agent, or Firm*—Fay, Sharpe, Beall, Fagan, Minnich & McKee

[57] ABSTRACT

The invention concerns a method and apparatus for preparing for detaching meat from the extremities of a slaughtered animal, particularly the legs of poultry. In this method, the meat is initially at least partially detached from the bone structure at the rear side of the extremity from its proximal end to its distal end to form a cavity and then the meat layer surrounding the bone structure is cut open with an incision made from the outside of the extremity towards the cavity. The partial detachment of meat is performed by a curved spike-shaped element, which is inserted between the muscle meat and bone in the region of the proximal end of the extremity and advanced through the extremity along the rear side of the bone structure up to the distal end. The spike-shaped element subsequently serves as a counter support for a knife, which is guided from outside to cut open the meat layer surrounding the bone structure.

23 Claims, 5 Drawing Sheets 5,542,879

METHOD AND APPARATUS FOR DETACHING THE MEAT FROM THE BONES OF THE EXTREMITIES OF ANIMALS

BACKGROUND OF THE INVENTION

1. Field of the Invention

The invention concerns a method and apparatus for preparing for the removal of meat from the extremities of slaughtered animals, particularly the legs of poultry, which have been separated for the carcass in the region of the body joint.

2. Prior Art

An apparatus for detaching meat from the upper and lower legs of poultry is known from U.S. Pat. No. 5,228,881. This apparatus comprises a first apparatus portion for cutting open the meat along one side of the upper and lower leg. The processing step carried out with this apparatus serves as preparation for removing the meat from the leg bone. To this end, the distal end or the knuckle of a leg is held in a clamp and, while supported on its inner flank, is fed lengthways to a cutting station having a fixed knife with a transverse end cutting plier and a knife oscillating parallel thereto. The fixed knife is controllably inserted into the meat in the region of the clamp adjacent the lower leg bone and, by virtue of the advancing motion of the leg, moved along the rear side of the bone structure, while the oscillating knife is intended to cut open the flesh along the length of the bone structure.

The guiding of the knife in the exact manner required is practically not possible, particularly in the region of the knee joint, as here both tendons, which inevitably have to be severed, and soft cartilage are embedded in the muscle, so that the knife lacks orientation. It is thus unavoidable that the cartilage is frequently nicked or scraped off and that these parts subsequently have to be removed from the meat by costly trimming work. Furthermore, this known device is very complex and expensive and requires highly qualified personnel for maintaining its operation.

3. Objects of the Invention

An object of the present invention is thus to remove the flesh parts surrounding the bone structure in such a way that practically no subsequent trimming work is necessary.

A further object of the present invention is to provide a method for removing the flesh parts surrounding the bone structure wherein the functional steps are substantially simplified.

A still further important object of the present invention is to provide an apparatus for removing the flesh parts surrounding the bone structure having a greatly simplified construction compared to prior art devices.

SUMMARY OF THE INVENTION

In a method for for preparing for the removal of meat from the extremities of slaughtered animals, particularly the legs of poultry, which have been separated from the carcass in the region of the body joint, these and further objects of the invention are achieved by detaching the meat layer surrounding the bone structure at the rear portion of the extremity at least partially and in desired zones from the bone structure and cutting open the meat using a cut running essentially perpendicular to the plane of the poultry leg and along the rear side of the bone structure.

According to another aspect of the invention, there is provided an apparatus for advantageously performing this method, the apparatus being characterized by a holding device for fixing the extremity to be processed in the region of at least one of the ends of the leg bone, a spike-shaped element being insertible from at least one of the ends of the leg bone between the muscle meat and bone along the rear side of the bone structure and a cutting device for cutting open the meat layer surrounding the bone structure with at least one knife arranged to be guided essentially perpendicular to the plane in which the bent poultry leg lies and along the length of the bone structure, and in which there may also be arranged a severing device for severing the tendons in the region of the distal end of the extremity.

The utilization of this concept results in a series of substantial advantages. The bending angle between upper and lower leg is stretched to a uniform degree, resulting in the standardization of the bending angles that occur in practice. Furthermore, the bending angle is fixed and a defined position of the angle is achieved, so that precise processing is possible without further measuring and adjusting measures being necessary.

A further advantage associated with the utilization of a single spike-shaped element lies in the use of the fact that, upon insertion, the element opposes resistant forces which vary in accordance with the changing anatomy. Thus, for example, a measurement value may be derived from the increase in insertion force of the spike-shaped element at the distal joint region caused by a locally strong connection between muscle and bone, and used in connection with the insertion distance covered to give a measurement of the total length of the extremity to be processed.

Further advantageous processing examples and embodiments are described in the dependent claims.

BRIEF DESCRIPTION OF THE DRAWINGS

Further objects and advantages of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

Figure 1:
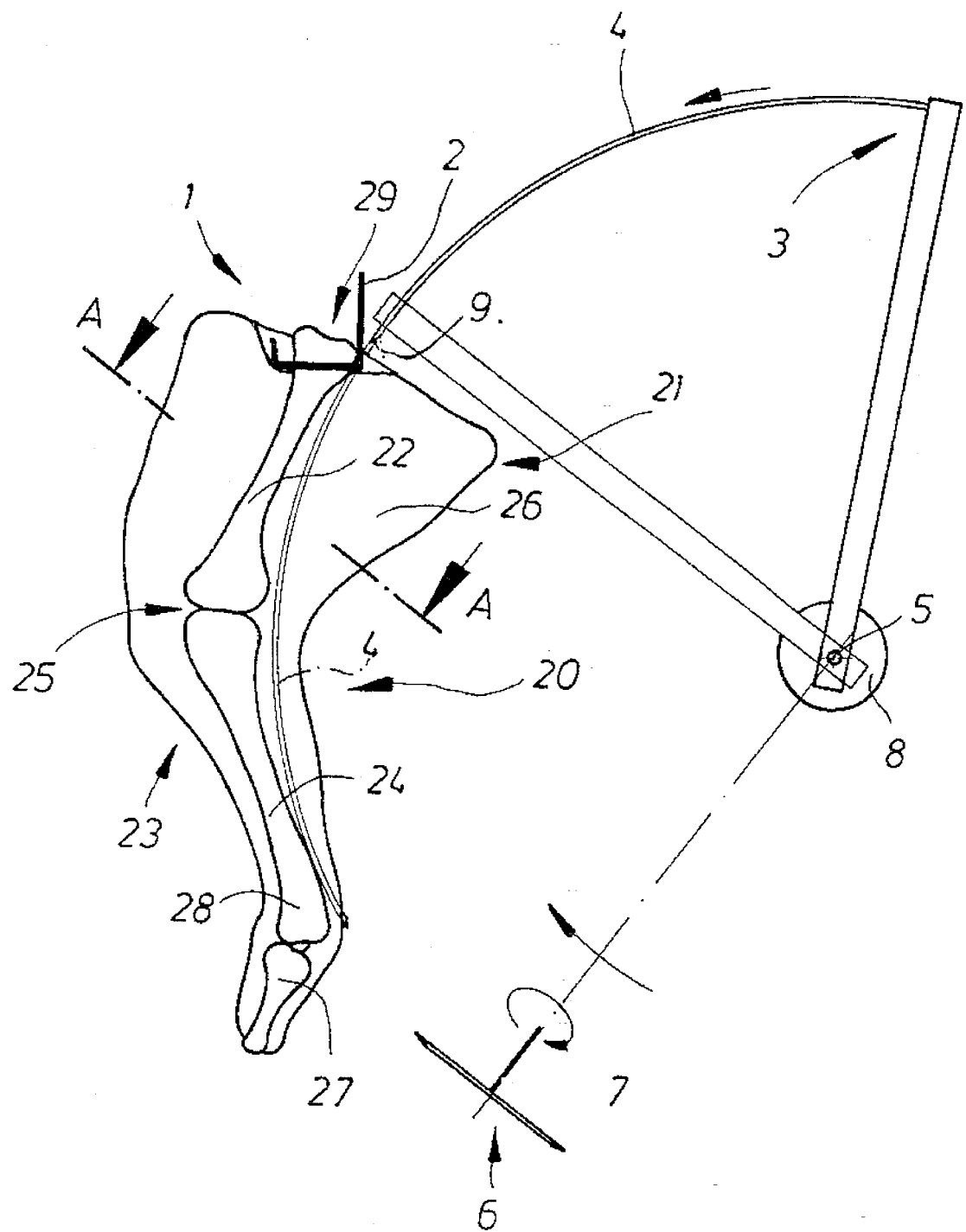
FIG. 1 shows a simplified, schematic and partially sectional representation of a poultry leg positioned for processing with a spiking tool comprising a spike-shaped element in both rest and active positions.

In a frame (not shown) of a machine for processing poultry legs there are arranged, as shown in FIG. 1, a conveyor 1 with holding elements 2 fixed to the conveyor in an appropriate manner for holding poultry legs 20. The poultry legs 20 to be processed comprise the entire extremity including upper and lower legs 21, 23 connected by a knee joint 25 and surrounded by a meat layer 26. As is illustrated, a part of the foot bone 27 may also be connected to the distal head of the lower leg bone 24.

The holding elements 2 are bifurcated and dimensioned such that the poultry leg 20 is held between the two branches of the holding element 2 by the proximal condyle or bone head 29 of the upper leg bone 22 or at the swollen part representing the remains of the bone head 29.

A spiking tool 3, essentially comprising a spike-shaped element 4, is associated with the path of the holding elements 2 and arranged to pivot about an axis 5 extending essentially perpendicular to the plane of the poultry leg 20. The spike-shaped element 4 is curved and forms a segment of a circle having a centre of curvature through which the axis 5 is arranged. The radius of the curve is chosen such that the curve approaches the natural angle of the knee joint 23. As shown in FIG. 1, in the active position, the spike-shaped element is thus tangential to both the proximal and distal end portions of the upper and lower leg bones 22, 24, respectively, and the knee joint 25. A cutting device 6, comprising a driven circular knife 7 is also pivotally mounted about the axis 5. The cutting plane of the circular knife 7 is arranged such that it extends tangentially to the outer i.e convexly curved side of the spike-shaped element 4. The pivotal movement of the cutting device 6 can be achieved using a swivel drive (not shown) with adjustable strike length and the pivotal movement of the spike-shaped element can be achieved using a adjustment mechanism controlled with respect to the angle of rotation and the torque.

Figure 2:
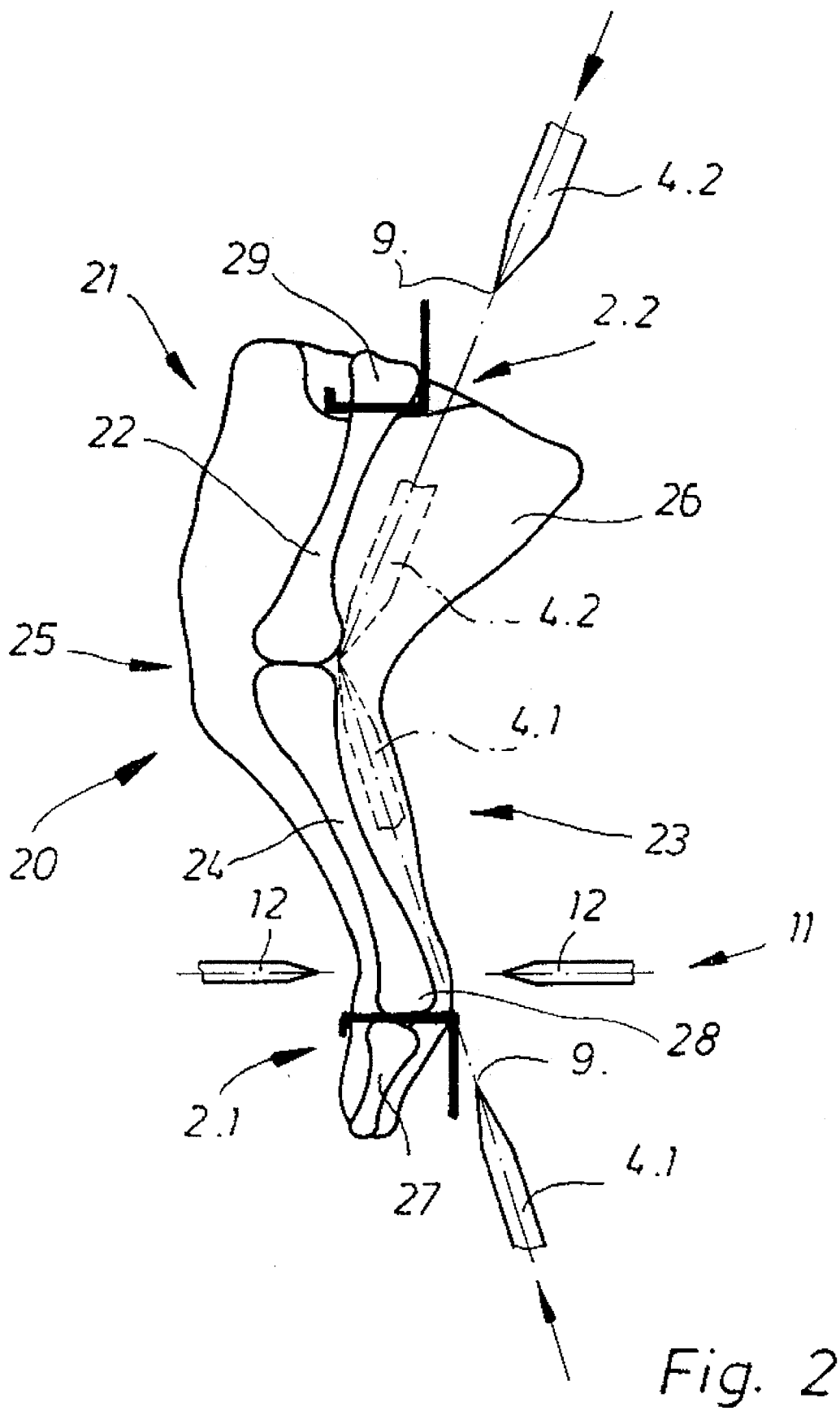
FIG. 2 shows the poultry leg according to FIG. 1 with a modified spiking tool comprising two spike-shaped elements in both rest and active positions.

According to the embodiment of FIG. 2, the poultry leg 20 is held in both the region of the distal bone head 28 and the proximal bone head 29 by means of a fork-shaped holding element, 2.1, 2,2 , respectively, the fork-shaped elements being arranged as components of the conveyor 1 in an appropriate manner. One spike-shaped element, 4.1, 4.2, respectively, is associated with the path of each of these holding elements 2.1, 2.2. These spike-shaped elements 4.1, 4.2 are movable essentially in the direction of longitudinal extension of the lower or upper leg bones, 24, 22, respectively. To this end, the paths of the holding elements 2.1 and 2.2 and the path of movement of the spike-shaped elements 4.1 and 4.2 are coordinated with one another in such a way that the pointed leading ends 9 of the spike-shaped elements 4.1, 4.2 penetrate into the meat layer 26 directly adjacent the corresponding distal or proximal bone head 28, 29. At the height of the path of the distal bone head 28, there is also arranged a tendon severing device 11, which is equipped with preferably driven knives 12 which are guided around the lower leg bone 24 in a known manner. The cutting device 6 is arranged to be movable along the path of the spike-shaped elements 4.1 and 4.2 in accordance with the embodiment of FIG. 1, and can also comprise two cutting units, wherein one unit, respectively, is associated with one spike-shaped element 4.1 and 4.2 and the cutting plane of each circular knife 7 is arranged to run tangentially to the outer face of the corresponding spike-shaped element 4.1, 4.2. The movement of the spike-shaped elements 4.1 and 4.2 and the cutting device 6 can be achieved by hydraulically or pneumatically driven cylinder-piston units (not shown).

Figure 5:
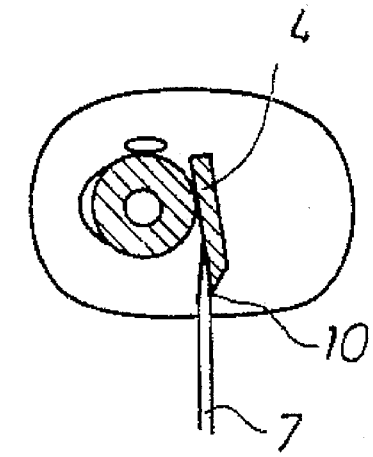
Figure 6:
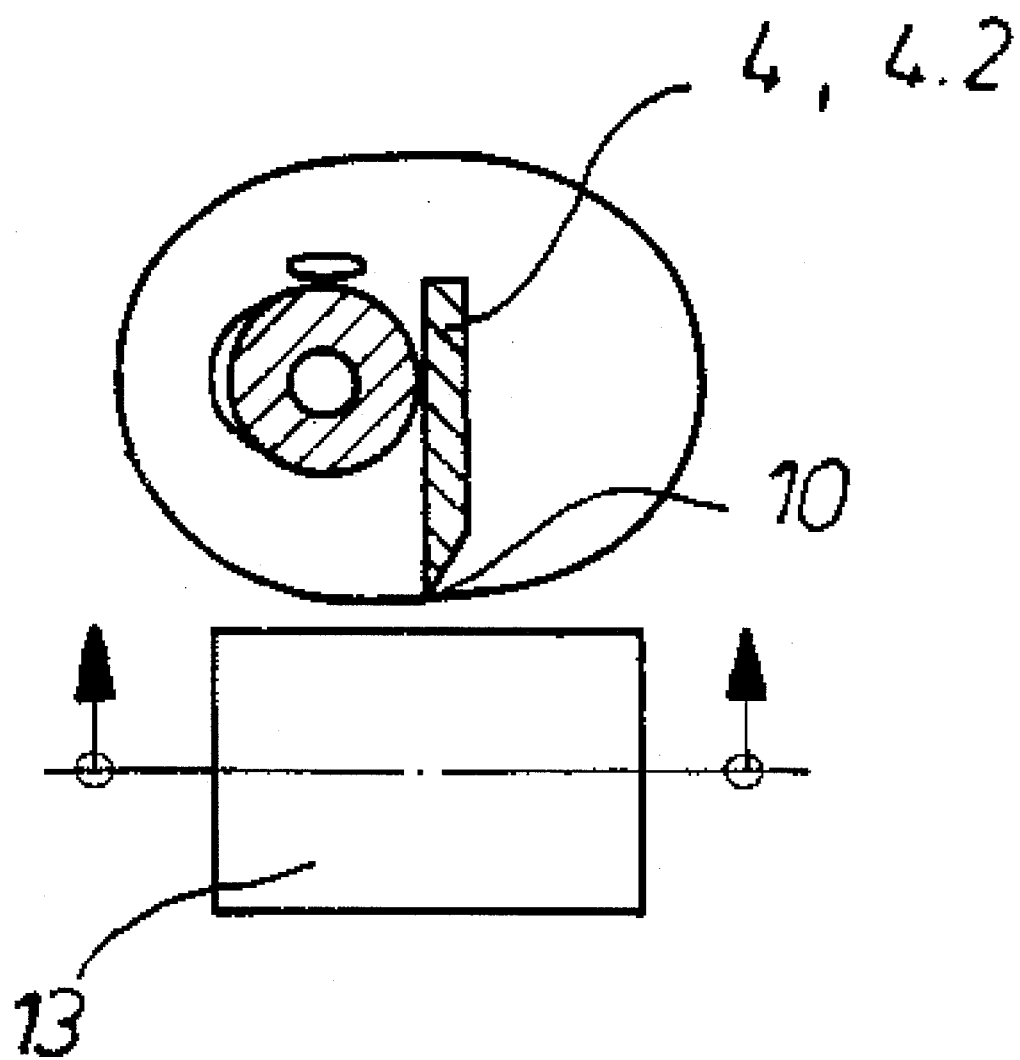

In accordance with FIGS. 5 and 6, each spike-shaped element 4, 4.1, 4.2 may be provided with a lateral cutting edge 10, which effects a partial cutting-open of the of the meat layer 26 during insertion of the spike-shaped element. In combination therewith, the circular knives 7 of the cutting device used for cutting open the meat layer 26 may be replaced by a pressing roller 13, which can be guided over the flank of the poultry leg under pressure to press against the cutting edge 10, so that the meat layer 26 is completely cut open from the inside to the outside.

Figure 7:
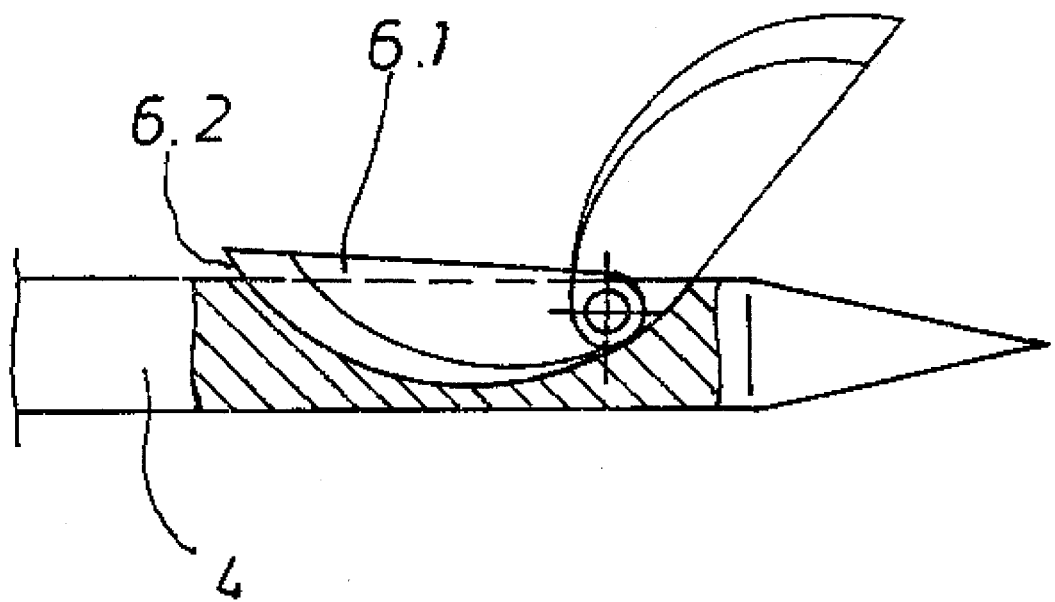
FIG. 7 shows a partial longitudinal sectional view through a spiking tool with integrated cutting device.

This may also be achieved with the embodiment of the cutting device shown in FIG. 7, i.e. with an integrated knife 6.1 arranged in the distal end region of the spike-shaped element 4 which becomes erect when the element 4 is withdrawn to cut open the meat layer with its cutting edge.

The operation of the apparatus according to the invention is described in the following.

After a poultry leg 20 to be processed is hung up by its proximal bone head 29 according to FIG. 1, it is advanced by the conveyor 1 into a position in which the plane in which the bent poultry leg 20 lies corresponds to the plane of rotation of the of the spiking tool 3, with the spiking tool 3 facing the rear of the poultry leg. In this position, the poultry leg 20 is fixed by non-shown aligning and supporting elements, which are brought into contact with the sides and front of the poultry leg 20 in an appropriate manner. Thereafter, the spiking tool 3 is pivoted, which results in the pointed leading end 9 of the spike-shaped element 4 penetrating the muscle meat at the rear of, and immediately adjacent, the proximal bone head 29.

During its continued pivotal movement, the spike-shaped element 4 finds its way along the rear bone structure and the poultry leg experiences a certain stretching force which it tends to oppose, so that the pointed end 9 of the spike-shaped element 4 is held pressed against the bone structure during its advancement. The advancement is controlled to halt when the pointed end 9 arrives in the region of the distal bone head 28. During this step, the increase in pivotal force caused by the strong connection between muscle and bone in this area is evaluated. An additional evaluation of the pivotal path covered up to this point by the spiking tool 3 simultaneously provides a measurement value for the length of the poultry leg 20 to be processed.

After this processing step, the cutting device 6 is activated and caused to move against the spike-shaped tool 4. The cutting depth of the circular knife 7 can be controlled such that, for example, it first penetrates the meat layer 26 proximally behind the distal bone head 28 and leaves the meat in the region of the proximal bone head 29. During the cutting operation, the circular knife 7 is guided along the outer side of the spike-shaped element 4 which faces the bone structure, the element 4 serving as a counter support for the knife 7.

Figure 3:
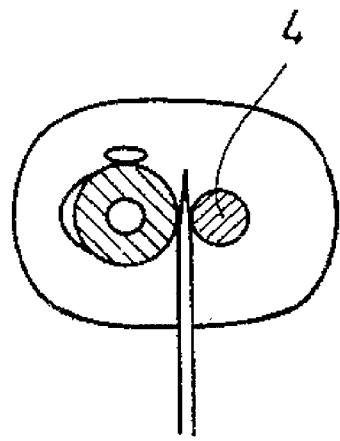
FIGS. 3 to 6 each show a sectional view of the poultry leg according to FIG. 1 along line A—A with a modified spiking tool.
Figure 4:
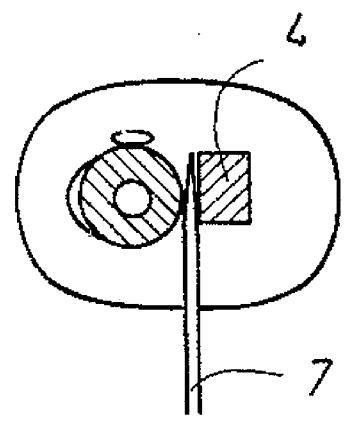

As shown in FIGS. 3 to 5, the cross-section of the spike-shaped element 4 can be selected according to the species and size of the animal. The cutting device 6 may also be replaced by a knife integrated in the end region of the spike-shaped element 4, which designed to be controlle from outside such that its cutting edge stands laterally out of the spike-shaped element 4 when the latter is withdrawn from the poultry leg 20, while the meat layer 26 is cut open from within during withdrawal of the element 4.

In the apparatus according to FIG. 2 the poultry leg held at both its distal and proximal bone heads 28, 29 is brought into position and fixed in an analogue manner to that described above. The tendon severing device 11 is then activated, which performs a cut around the lower leg bone 24 in the region of the distal bone head 28 in an appropriate manner and so severs the tendons and skin located there. The spiking tool 3 is subsequently activated so that the spike-shaped elements 4.1 and 4.2 penetrate into the muscle meat with their pointed leading ends 9 at the rear side of, and directly adjacent the distal and proximal bone heads 28, 29, respectively. The penetration depth is expediently controlled so that the pointed leading ends 9 meet in the region of the knee joint 25.

After this processing step, the cutting device 6 is activated to perform a cut for cutting open the meat layer 26 along the length of the outer side of the spike-shaped elements 4.1, 4.2 facing the bone structure, while using these elements as counter supports for the knife. This cut for cutting open the meat layer 26 can be performed with a spike-shaped element having a lateral cutting edge 10 in accordance with FIG. 6, whereby after insertion of this element, a pressing roller 13 is guided under pressure over the flank of the poultry leg 20 so that the muscle meat lying over the cutting edge 10 is pressed against the cutting edge.

We claim:

1. A method for pre-processing extremities of slaughtered animals, particularly poultry legs, prior to removing meat therefrom, said extremity defining a distal and a proximal end, having a bone structure and being surrounded by a layer of meat, the method including the steps of
   a) holding said extremity by at least one of said distal and proximal ends such that said extremity lies essentially in a predetermined plane,
   b) detaching said meat layer from said bone structure in at least in an area on a predetermined side of said bone structure in said plane and
   c) cutting open said meat layer with a cut which runs essentially perpendicular to said plane and along said predetermined side of said bone structure.

2. A method as claimed in claim 1, wherein the partial detachment of the meat layer from the bone structure is performed from the proximal end towards the distal end of the extremity.

3. A method as claimed in claim 1, wherein said step of cutting open the meat layer is carried out starting from within said area of detachment of meat from the bone structure towards the outside of said meat layer.

4. A method as claimed in claim 1, wherein said step of cutting open the meat layer is carried out starting from the outside of the meat layer towards said area of detachment of said meat from said bone structure.

5. A method for pre-processing the extremities of slaughtered animals, particularly poultry legs, prior to removing meat therefrom, said extremity defining a distal and a proximal end and having a bone structure which includes a distal and a proximal bone connected by a joint and surrounded by a layer of meat, said extremity being bent about said joint to enclose an obtuse angle at a rear side, the method including the steps of
   a) holding said extremity by at least one of said distal and proximal ends such that it lies essentially in a predetermined plane,
   b) detaching said meat layer from said bone structure at least in an area on said rear side of said bone structure and
   c) cutting open said meat layer with a cut which runs essentially perpendicular to said plane and along said rear side of said bone structure.

6. A method as claimed in claim 5, wherein prior to performing the steps of claim 5, tendons and skin located at the distal end of the extremity are severed.

7. A method as claimed in claim 5, wherein the partial detachment of the meat layer from the bone structure commences from both the proximal and distal ends of the extremity.

8. A method as claimed in claim 5, wherein the partial detachment of the meat layer from the bone structure is performed from the proximal end towards the distal end of the extremity.

9. A method as claimed in claim 5, wherein said step of cutting open the meat layer is carried out starting from within said area of detachment of said meat from said bone structure towards the outside of said meat layer.

10. A method as claimed in claim 5, wherein said step of cutting open the meat layer is carried out starting from the outside of the meat layer towards said area of detachment of said meat from said bone structure.

11. An apparatus for pre-processing the extremities of slaughtered animals, particularly poultry legs, said extremities defining a distal and a proximal end and having a bone structure surrounded by a layer of meat, said bone structure comprising at least a distal bone and a proximal bone connected by a joint, said apparatus comprising
   a) holding means for fixing said extremity at at least one of said distal and proximal ends such that said extremity lies in essentially one plane,
   b) at least one spiking means having a leading end for piercing insertion between said meat and said bone at a rear side of said bone structure from at least one of said ends of said extremity and
   c) cutting means having at least one knife which is guided along the length of the bone structure essentially perpendicular to said plane for cutting open said meat layer.

12. An apparatus as claimed in claim 11, wherein severing means are provided for severing tendons and skin located at said distal end.

13. An apparatus as claimed in claim 11, wherein said holding means comprise one holding element, respectively, for engaging each of said proximal and distal ends of said extremity, said spiking means further comprising two spiking elements, one of said spiking elements, respectively, being adapted for controlled insertion into said meat layer from adjacent each of said proximal and distal ends, said spiking elements further being adapted to be guided in said plane towards the knee joint.

14. An apparatus as claimed in claim 11, wherein said holding means comprise a holding element for engaging said proximal end of the extremity and wherein said spiking means further comprises a spiking member for controlled insertion into said meat layer from adjacent said proximal end, said spiking element being adapted to be guided in said plane towards a distal end of said extremity.

15. An apparatus as claimed in claim 11, wherein said spiking member is formed as an arc and is guided to move in a circular path, whereby said arc has a centre of curvature which is concentric with the centre of curvature of said circular path.

16. An apparatus as claimed in claim 13, wherein said spiking elements are arranged to move at an angle to one another, said angle essentially corresponding to the natural angle between said distal and proximal bones.

17. An apparatus as claimed in claim 11, wherein said leading end of said spiking means is tapered and rounded.

18. An apparatus as claimed in claim 11, wherein said spiking means has one of an essentially circular, elliptical and rectangular cross section.

19. An apparatus as claimed in claim 11, wherein said spiking means is provided with a lateral cutting edge.

20. An apparatus as claimed in claim 11, wherein sensors are provided for monitoring the torque and turning distance of said spiking means.

21. An apparatus as claimed in claim 11, wherein said cutting means comprise a driven circular knife, which is guided to shear against a surface of said spiking means.

22. An apparatus as claimed in claim 19, wherein said cutting means comprise a pressing roller, which may be guided over an outer flank of said extremity to press said meat against said lateral cutting edge.

23. An apparatus as claimed in claim 11, wherein said cutting means is formed as a lateral knife arranged at said leading end of each spiking means and controlled such that said knife projects laterally from said spiking means only when the movement of said spiking means is reversed.

* * * * *